United States Patent Office 2,858,286
Patented Oct. 28, 1958

2,858,286

PLASTIC COMPOSITIONS CONTAINING CARBONATO ESTERS OF FATTY ACIDS

William L. Riedeman, Philadelphia, Pa., assignor to Rohm & Haas Company, Philadelphia, Pa., a corporation of Delaware No Drawing. Application December 9, 1954
Serial No. 474,269

8 Claims. (Cl. 260—23)

This invention, which is a continuation-in-part of my application, Serial No. 424,758, filed Apr. 21, 1954, Patent No. 2,826,551, relates to plastic compositions containing carbonato esters of fatty acids. It relates to plastic compositions which contain, as plasticizers, those esters which contain in the alcohol moiety thereof one to 18 carbon atoms and which contain in the acid moiety thereof 16 to 22 carbon atoms and which also contain one or more groups having the formula

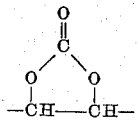

in each acid portion of the esters. More particularly it relates to vinyl resin compositions which contain carbonatostearates having the formula

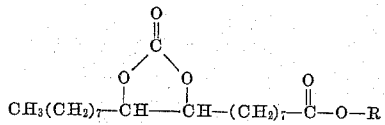

in which R represents a monovalent hydrocarbon radical containing one to 18 carbon atoms.

The carbonato esters which are employed in this invention are unusually high boiling liquids which have lubricating properties in their own right and are highly compatible with a wide variety of plastic materials. They are the subject of my application, Serial No. 424,758, referred to above. By virtue of the presence of the carbonato groups in the fatty acid chains, the esters are far more compatible with plastic materials, such as cellulosic esters and vinyl halide resins, than are the corresponding esters which do not contain carbonato groups. Accordingly they are eminently suitable for use as plasticizers in plastic compositions.

The carbonato esters which are employed as plasticizers in the plastic compositions of this invention can be made by at least two methods. In one process, phosgene is reacted with an ester containing at least two hydroxyl groups on adjacent carbon atoms of the acid moiety of the ester. Hydrogen chloride is split out and, therefore, the reaction is best carried out in the presence of an acceptor for hydrogen chloride. In another process, the same kind of polyhydroxylated ester is reacted with a dialkyl carbonate, such as dimethyl carbonate or diethyl carbonate, by ester-interchange in the presence of a catalyst such as metallic sodium or an alkali metal alkoxide.

In either process, the materials, from which the carbonato plasticizers are made, are esters which contain one or more pairs of hydroxyl groups on adjacent carbon atoms of the aliphatic chain in the acid portion of the ester. Such polyhydroxy esters are made by known methods. For example, an ester of an unsaturated acid which contains one or more double bonds is reacted with hydrogen peroxide and a large excess of formic acid or acetic acid whereby an hydroxy-acyloxy derivative is produced. This, in turn, is converted to the polyhydroxy compound by hydrolysis of the acyloxy group, or by alcoholysis according to the process of U. S. Patent No. 2,669,572.

It is now evident that the starting material is an ester of an acid which contains 16 to 22 carbon atoms and which also contains one or more double bonds. Typical of such acids are oleic acid, erucic acid, elaeostearic acid, linoleic acid, linolenic acid, clupanodonic acid, plamitoleic acid and palmitolenic acid. All of these acids occur in animal or vegetable oils, for example, in soybean, rapeseed, linseed, sardine and whale oils and are readily obtained by the saponification of the naturally occurring oils. The esters of the fatty acids which are ultimately converted to carbonato esters are those of monohydric and polyhydric alcohols typified by the following: mono-, di-, and tri-substituted carbinols, such as ethyl, isopropyl, n-butyl, sec-butyl, tert-butyl, tert-amyl, n-octyl, 2-ethylhexyl, octadecyl, lauryl, cyclohexyl and benzyl; polyhydric alcohols, such as ethylene glycol, 1,2-propylene glycol, 2-ethylhexandiol-1,3, butandiol-1,2, butandiol-1,3, butandiol-1,4, dodecandiol-1,12, polyalkylene glycols, such as diethylene glycol; glycerol; pentaerythritol; and the isomers and homologues of the above. This invention also embraces the use of mixed carbonato esters such as those of ethylene oleate-linoleate, glyceryl di-oleate-monolinoleate, butylene linoleate-oleate and the like. The naturally occurring vegetable and animal oils likewise give rise to the carbonato esters which are employed in the plastic compositions of this invention. These oils, which are mixed esters of glycerol and a mixture of the acids mentioned above include the following: soybean, corn, cottonseed, safflower, sunflower, sesame, poppyseed, walnut, peanut, linseed, sardine, perilla and fish oils in general. Since all of these esters contain aliphatic unsaturation, they can readily be converted first to the polyhydroxy derivative and thereafter to the carbonato products. While it is preferred that all of the double bonds in any given ester be converted to carbonato groups, complete conversion is sometimes difficult to obtain, especially in the case of the naturally occurring oils. It has been found, however, that the carbonato groups impart to esters the greatly enhanced solubility in, and compatibility with, plastic materials particularly nitrocellulose, cellulose esters and resins of the vinyl halide type. Therefore, it is not essential that every double bond be converted to a carbonato group. It is essential, however, that at least one double bond in each acid chain be thus converted on the average. In the case of the esters of the polyhydric alcohols—particularly the naturally occurring oils which are esters of glycerol and a mixture of acids, including saturated and unsaturated acids—it is essential that at least one carbonato group be present for each acid moiety of said ester. Thus, when the glyceride oils are considered, it is necessary to have present an average of at least three carbonato groups per molecule of glyceride oil. It is virtually impossible to direct the reaction so that the carbonato groups are distributed uniformly in every acid chain; but for practical purposes the introduction of an average of at least one carbonato group for each acid moiety is required so that the resultant ester will have satisfactory compatibility with plastic materials.

The carbonato esters which have proven to be especially valuable as plasticizers for vinyl resins and which, therefore, have the greatest commercial value at the moment are those of 9,10-carbonatostearic acid having the general formula

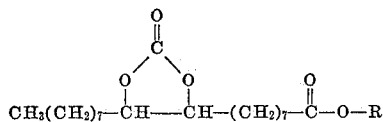

in which the character R represents a monovalent hydrocarbon containing 1 to 18 carbon atoms—and is preferably an alkyl group. These are made from dihydroxystearic acid, which, itself, is made from oleic acid.

The reaction of phosgene with the polyhydroxy esters is best carried out at a temperature from $-10°$ C. to the boiling point of the reaction mixture. In commercial practice, it is preferred to carry out the reaction at a temperature from about $-10°$ C. to about $60°$ C. because of the volatility of the phosgene. The phosgene may be bubbled into the ester; but a more satisfactory method appears to be that of reacting the ester with a solution of phosgene in an organic liquid, such as benzene, which is a solvent for the hydroxylated ester. It is most desirable that a mildly basic acceptor for hydrogen chloride be present; and for this purpose tertiary amines and weakly basic anion-exchange resins have each been used. Pyridine is very effective and its use is recommended at lower temperatures while anion-exchange resins are best used at higher temperatures. Other tertiary amines which can be used like pyridine include quinoline, isoquinoline, dimethylaniline, diethylaniline, trimethylamine, triethylamine, tri-n-butylamine, and the like. What is desired is that an acceptor be present which will take up the hydrogen chloride as fast as it is formed without causing saponification of the ester. In the process of preparing the carbonato esters by ester-interchange, the ester is reacted with an alkyl carbonate at a temperature which is high enough to cause the alcohol to distill out of the reaction mixture. Here, as in the phosgene reaction, the use of a solvent, such as an aromatic hydrocarbon, is recommended; or an excess of the alkyl carbonate itself may serve as a solvent. Alkali metals, such as sodium and potassium, serve as excellent catalysts. Metal alkoxides have also been used.

The plastic compositions of this invention which contain the carbonato esters are flexible, tough and stable. The carbonato esters are extremely compatible with plastics—particularly with vinyl resins—and give rise to plasticized compositions which are extremely stable. Various quantities of the carbonato esters can be employed, depending on the degree of plasticization which is required and also depending on the amounts and kinds of other materials, such as fillers and extenders which may be present. While as little as 10% of a carbonato ester, based on the combined weight of the plastic material to be plasticized and said ester, exerts a softening effect, it is recommended that larger amounts be used. Thus, in the preparation of unfilled and unpigmented compositions of high flexiblity, the amount of the carbonato ester which is employed is of the order of 35% to 50%, on the same basis, when the carbonato ester is the sole plasticizer.

Other modifiers, such as dyes, pigments, extenders, mold lubricants, stabilizers and other plasticizers, including resinous plasticizers, can be present in the plastic compositions without departing from the spirit of this invention, which invention is one of providing plastic compositions containing carbonato esters such as are described above.

The vinyl resins which can be plasticized to advantage with the carbonato esters of this invention are more properly defined as "vinyl halide resins" and this term is herein used to embrace the following: Polymers of a vinyl halide, such as vinyl chloride and vinyl bromide; copolymers of a vinyl halide and a vinyl ester of the lower aliphatic acid, such as copolymers of vinyl chloride and vinyl acetate or vinyl propionate; copolymers of vinyl halides, such as vinyl chloride, and vinylidene halides, such as vinylidene chloride; and copolymers of a vinyl halide with other copolymerizable compounds containing a vinylidene group, $CH_2=C<$, such as ethyl acrylate, methyl methacrylate and the like. Preferred copolymers of this type are those which contain from about 60 to about 95% of copolymerized vinyl chloride and 5% to 40% of the other copolymerized vinylidene compound.

The following examples are intended to illustrate the manner in which carbonato esters are made and are utilized in the compositions of this invention. While the examples are drawn to the preparation and use of esters of 9,10-carbonatostearic acid, it is to be understood that the other esters described above are prepared in the same manner and are employed in the same way in the plastic compositions of this invention.

EXAMPLE 1

Into a reaction vessel equipped with an agitator, thermometer and gas-inlet tube there was charged 125 grams of a mixture of the lauryl ester and the myristyl ester of 9,10-dihydroxystearic acid dissolved in 250 ml. of benzene. To this was added 110 grams of a weakly basic anion-exchange resin containing tertiary amine groups. In a separate container was prepared a solution of 37 grams of phosgene dissolved in 150 grams of benzene. The solution of the ester was stirred and to it was added slowly over a period of 30 minutes the benzene solution of phosgene. The latter was added at such a rate that the temperature was maintained between $40°$ and $45°$ since the reaction is exothermic. Thereafter the reaction mixture was held at $40°$ to $45°$ for a period of 2½ hours and was then filtered to remove the particles of anion-exchange resin. The filtrate was then stripped under vacuum to remove benzene and other volatile constituents. The oil residue was thereafter purified by molecular distillation and gave rise to an essentially colorless oil which, by analysis, was shown to contain essentially the theoretical number of carbonato groups.

In the same manner the individual n-octyl and 2-ethylhexyl esters of carbonatostearic acid were prepared. Also a mixture of the decyl and lauryl esters of carbonatostearic acid was prepared in the same way by the reaction of phosgene with a mixture of decyl and lauryl dihydroxystearates. All of the products were high boiling oils which were compatible with polyvinyl chloride and with a copolymer of vinyl chloride and vinylidene chloride.

EXAMPLE 2

To a three-necked reactor equipped with a mechanical agitator, thermometer, condenser, and water-separator was charged 100 grams of n-hexyl 9,10-dihydroxystearate, 32.5 grams of diethyl carbonate and approximately 0.25 gram of metallic sodium. The stirred reaction mixture was heated to $110°$ C. Ethyl alcohol which was liberated from the reaction mixture was collected in the water separator. Over a period of six hours the temperature of the reaction mixture rose gradually to $130°$ C. during which time a total of 19 grams of liquid condensed and was collected in the separator. The reaction mixture was then carefully stripped under vacuum to remove residual volatile constituents. The oily residue was dissolved in 100 grams of benzene and the solution was washed with a 2% aqueous solution of oxalic acid until the basicity was neutralized and was thereafter thoroughly washed to neutrality with water. The benzene solution was then dried over anhydrous magnesium sulfate and was filtered. The benzene was removed under vacuum and a product was obtained which was subsequently purified by molecular distillation yielding 61 grams of an essentially colorless oil whose analysis corresponded to that of hexyl 9,10-carbonatostearate.

EXAMPLE 3

The general procedure of Example 1 was followed. Here, however, pyridine was used as the HCl-acceptor in place of the anion-exchange resin used in the first example. Thus 100 grams of 2-ethylbutyl dihydroxystearate (0.5 mole) was dissolved in 55.3 grams of pyridine and was reacted with a solution of 29.7 grams of phosgene (0.3 mole) dissolved in 100 grams of toluene. The reaction mixture was maintained at a temperature of —5° to 0° while the phosgene solution was added (35 min.). The reaction mixture was held first at 0° to 2° C. for 2 hours and then at about 20° C. for 2 hours. Thereafter the reaction mixture was washed thoroughly, stripped of benzene and pyridine was purified by distillation (boiling range 240° C./1.3 mm. to 263° C./0.4 mm.). The product, 2-ethylbutyl carbonatostearate, was a pale oil having an index of refraction ($n_D^{25}$) of 1.4573. Its composition was confirmed by analysis (percent C: theory=70.39, analysis=70.47; percent H: theory=10.82, analysis=10.92).

In a similar manner the 2-ethylhexyl ester of carbonatostearic acid was prepared. It was essentially identical with the 2-ethylhexyl carbonatostearate prepared by the process of Example 1.

By the same method the n-butyl ester of carbonatostearic acid was prepared. It, too, was a pale oil whose composition was confirmed by analysis (percent C: theory=69.31, analysis=69.27; percent H: theory=10.62, analysis=10.54; $n_D^{25}$=1.4560; boiling range: 247° to 254° C./0.6 mm.).

Also by the same method the β-chloroethyl ester of carbonatostearic acid was prepared. Its index of refraction was $n_D^{25}$=1.4644, and its boiling range was 264° C./1.8 mm.–282° C./1.6 mm. Its analysis confirmed its structure (percent 1: theory=62.27, analysis=62.07; percent H: theory=9.21, analysis=9.10; percent Cl: theory=8.79, analysis=8.64).

EXAMPLE 4

Into a reaction vessel equipped with a stirrer, thermometer, reflux condenser and dropping funnel was charged a solution of 163 grams (0.4 mole) of benzyl 9,10-dihydroxystearate in 200 ml. of toluene. Next there was added 79 grams of pyridine. The stirred solution was cooled and was maintained at a temperature of 0° to 5° C. while a solution of 60 grams (0.6 mole) of phosgene in 200 ml. of toluene (cooled to 0° to 5° C.) was added over a period of about one-half hour. The reaction mixture was stirred at 0° to 5° C. for an hour, after which it was allowed to warm up to room temperature and was held at room temperature for 16 hours. Then the reaction mixture was transferred to a separatory funnel and was shaken with 100 ml. of water and then with three 500 ml.-portions of water, 100 ml. of a 2% aqueous solution of sodium carbonate and again with two 500 ml.-portions of water. The organic phase was stripped free of toluene under vacuum. The crude product was purified by distillation in a short path still. The product, benzyl 9,10-carbonatostearate, was an oil which boiled at 255° to 270° C./0.20 mm., and which had an index of refraction of $n_D^{25}$=1.5390. Its composition was confirmed by analysis (percent C: theory=72.20, analysis=72.50; percent H: theory=9.34, analysis=9.45). Like the products of the previous examples, it was compatible with polyvinyl chloride and with a copolymer of about 95% vinyl chloride and about 5% vinyl acetate, and exercized a real plasticizing action.

EXAMPLE 5

In essentially the same manner as described in Example 4, a carbonatostearate was made from the 2-ethylbutyl ester of tetrahydroxy stearic acid (which had been made from linoleic acid). One-half mole (198 grams) of 2-ethylbutyl tetrahydroxystearate was fused and dissolved in 200 ml. of toluene and the solution was charged to the reaction vessel together with 240 grams of pyridine and cooled to 0° to 5° C. It was maintained within that temperature range while a solution of 140 grams (1.4 moles) of phosgene in 200 ml. of toluene was slowly added. When 25% of the phosgene solution had been added, 200 ml. of toluene was also added and an acetone-Dry Ice bath was employed to maintain the temperature within the range of 0° to 5° C. The remainder of the phosgene solution was added, followed by a one-hour period of stirring at 0° to 5° C. and 16 hours at room temperature. The product was worked up and isolated in the manner described above. It was a viscous oil. Analysis of the carbonato ester showed that it contained an average of more than one carbonato group per molecule of ester but not quite two carbonato groups. It was, however, compatible with polyvinyl chloride. A solution of 60% polyvinyl chloride and 40% of the carbonato ester (on a dry basis) dried to a clear, tough, tack-free film which was much softer than a film of the polyvinyl chloride alone.

EXAMPLE 6

Various thermoplastic compositions were prepared in the form of sheets by fluxing and milling at 325° F. the following materials: 60 parts of polyvinyl chloride (Geon 101); 40 parts of plasticizer; 1 part of tribasic lead sulfate as a stabilizer; and 0.5 part of stearic acid as a lubricant. (All parts are by weight.) Samples of various carbonato esters, prepared by the processes of the previous examples, were employed individually as plasticizers. The resultant compositions were compared with a similar control composition containing dioctyl phthalate as the sole plasticizer.

All of the compositions were subjected to the following tests:

(1) *Shore hardness.*—A Shore "A" durometer, under a weight of three pounds is applied to the test specimens. A recording is made at once and after 10 seconds; and the hardness is expressed by the two values, the first of which is the higher.

(2) *Gasoline extraction.*—Weighed samples are immersed in white, lead-free gasoline at 25° C. for 60 minutes, after which they are thoroughly dried and re-weighed. The loss in weight, expressed as the percentage of the original weight, is a measure of the amount of plasticizer which has been extracted by the gasoline.

(3) *Activated carbon volatility.*—Individual specimens are placed between 2" layers of activated charcoal in sealed glass jars which are maintained at 90° C. for 24 hours. The specimens are removed, dusted free of carbon, and re-weighed. Here again the loss in weight is a measure of the amount of plasticizer which has been removed by the carbon.

(4) *Fade-O-Meter test.*—Specimens are exposed in an Atlas Fade-O-Meter at 110° F. and changes in their appearance are recorded.

The results of these tests are tabulated below. In the first column are listed, together with dioctyl phthalate, the particular esters of carbonatostearic acid which were employed. The second column refers to the processes of the examples in this application whereby the particular carbonato esters were made.

Tabulation

| Ester of 9,10-Carbonato-stearate | Process of— | Shore Hardness | Gas. Extr., percent | Act. Charcoal Extr., percent | Fade-O-Meter | |
|---|---|---|---|---|---|---|
| | | | | | Tack, hrs. | Crack, hrs. |
| Chloroethyl | Ex. 3 | 63–58 | 11.3 | 1.4 | ca. 45 | ca. 130 |
| n-butyl | Ex. 3 | 63–58 | 18.1 | 3.5 | ca. 60 | ca. 300 |
| 2-ethylbutyl | Ex. 3 | 64–59 | 19.0 | 1.4 | ca. 200 | ca. 300 |
| n-hexyl | Ex. 2 | 61–57 | 21.9 | 2.0 | ca. 200 | ca. 350 |
| 2-ethylhexyl | Ex. 1 | 65–61 | 22.0 | 6.0 | ca. 100 | ca. 350 |
| Lauryl-myristyl | Ex. 1 | 71–66 | 25.3 | 1.1 | ca. 100 | ca. 300 |
| Dioctyl Phthalate. | Control | 70–65 | 23.4 | 8.1 | ca. 45 | ca. 250 |

I claim:

1. A composition comprising a vinyl halide resin and, as a plasticizer therefor, a carbonato ester of a fatty acid derived from natural fats and oils which contains in the alcohol moiety thereof one to 18 carbon atoms free of non-aromatic unsaturation, and which contains in an acid moiety thereof 16 to 22 carbon atoms excluding carbonato carbon atoms, and which also contains in said acid moiety a group of the formula

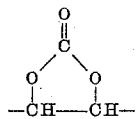

in a terminal position.

2. A composition comprising a vinyl halide resin and as a plasticizer therefor a carbonato vegetable oil which contains, in the acid moieties of said oil, a group of the formula

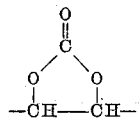

in a non-terminal position.

3. A composition comprising a vinyl halide resin and as a plasticizer therefor carbonato soybean oil which contains a carbonato group per acid moiety of said oil in a non-terminal position.

4. A composition comprising a vinyl halide resin and as a plasticizer therefor a carbonato ester which has the general formula

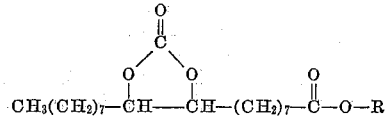

in which R is a monovalent hydrocarbon group free of non-aromatic unsaturation and containing one to 18 carbon atoms.

5. A composition comprising a vinyl halide resin and as a plasticizer therefor octyl 9,10-carbonatostearate.

6. A composition comprising a vinyl halide resin and as a plasticizer therefor butyl 9,10-carbonatostearate.

7. A composition comprising a vinyl halide resin and as a plasticizer therefor hexyl 9,10-carbonatostearate.

8. A composition comprising a vinyl halide resin and as a plasticizer therefor dodecyl 9,10-carbonatostearate.

No references cited.

UNITED STATES PATENT OFFICE
CERTIFICATE OF CORRECTION

Patent No. 2,858,286                                October 28, 1958

William L. Riedeman

It is hereby certified that error appears in the printed specification of the above numbered patent requiring correction and that the said Letters Patent should read as corrected below.

Column 7, line 31, for "terminal" read -- non-terminal --.

Signed and sealed this 13th day of January 1959.

(SEAL)
Attest:

KARL H. AXLINE                                       ROBERT C. WATSON
Attesting Officer                                      Commissioner of Patents